(12) United States Patent
Ouchi et al.

(10) Patent No.: US 11,394,333 B2
(45) Date of Patent: Jul. 19, 2022

(54) CONTROL METHOD FOR A MOTOR SYSTEM AND A CONTROL DEVICE FOR A MOTOR SYSTEM

(71) Applicant: NISSAN MOTOR CO., LTD., Yokohama (JP)

(72) Inventors: Toshio Ouchi, Kanagawa (JP); Kenichi Mori, Kanagawa (JP); Yoshihiro Kondo, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 84 days.

(21) Appl. No.: 17/050,898

(22) PCT Filed: May 10, 2018

(86) PCT No.: PCT/JP2018/018213
§ 371 (c)(1),
(2) Date: Oct. 27, 2020

(87) PCT Pub. No.: WO2019/215891
PCT Pub. Date: Nov. 14, 2019

(65) Prior Publication Data
US 2021/0234490 A1    Jul. 29, 2021

(51) Int. Cl.
| | | |
|---|---|---|
| H02P 1/00 | (2006.01) | |
| H02P 3/00 | (2006.01) | |
| H02P 5/00 | (2016.01) | |
| H02P 27/06 | (2006.01) | |
| H02M 3/158 | (2006.01) | |

(Continued)

(52) U.S. Cl.
CPC ............ *H02P 27/06* (2013.01); *H02M 3/158* (2013.01); *H02M 7/53871* (2013.01); *H02P 5/74* (2013.01); *H02P 2201/09* (2013.01)

(58) Field of Classification Search
CPC .... H02P 27/06; H02M 3/158; H02M 7/53871
USPC ......................................................... 318/139
See application file for complete search history.

(56) References Cited

U.S. PATENT DOCUMENTS

| | | | |
|---|---|---|---|
| 2013/0039108 A1* | 2/2013 | Watanabe ............... | H02M 7/48 363/131 |
| 2014/0125264 A1* | 5/2014 | Nakamura .......... | H02M 3/1582 318/400.23 |
| 2017/0274777 A1* | 9/2017 | Alam .................... | H02J 7/1492 |

(Continued)

FOREIGN PATENT DOCUMENTS

| | | |
|---|---|---|
| EP | 1 662 641 A2 | 5/2006 |
| EP | 3 235 670 A1 | 10/2017 |
| JP | 2017-178055 A | 10/2017 |

*Primary Examiner* — Erick D Glass
(74) *Attorney, Agent, or Firm* — Foley & Lardner LLP

(57) ABSTRACT

A control method for a motor system, the motor system having a battery; a boost converter configured to increase DC voltage supplied by the battery; an inverter connected to the boost converter and configured to execute a conversion between DC power and AC power; and a motor generator connected to the inverter. The control method comprising: a limiting power determination step of determining a limiting power in response to an operating point of the motor generator such that an oscillation of a terminal voltage of the boost converter at a side of the inverter is suppressed; and a controlling step of controlling the operating point of the motor generator such that a passing power of the boost converter does not exceed the limiting power.

6 Claims, 11 Drawing Sheets

(51) Int. Cl.
*H02M 7/5387* (2007.01)
*H02P 5/74* (2006.01)

(56) References Cited

U.S. PATENT DOCUMENTS

2017/0282905 A1   10/2017  Miyamoto et al.
2021/0188241 A1*  6/2021  Kikuchi ................ B60W 20/50

* cited by examiner

CONTROL METHOD FOR A MOTOR SYSTEM AND A CONTROL DEVICE FOR A MOTOR SYSTEM

TECHNICAL FIELD

The present invention relates to a control method for a motor system and a control device for a motor system.

BACKGROUND ART

Generally, in a motor control system such as an electric vehicle, in order to supply a required magnitude of AC power to the motor, DC power supplied from a battery is boosted by a converter, the power is converted from DC to AC by the inverter, and the AC power is supplied to the motor. However, when a large current flows in the boost converter, there is a possibility that a performance becomes lower because a temperature of the boost convertor increases.

For example, JP2017-178055A discloses an art of limiting a passing power of a boost converter when a temperature of the converter increases. According to the art, by considering a power which may be used other than the motor for with regard to a limited value for the passing power, it is possible to secure a required power for the motor even when the power is used other than the motor.

SUMMARY OF INVENTION

Here, in the boost converter, depending on an operating point of the motor, there is a possibility that the voltage at the inverter side oscillates. Therefore, even if the passing power is limited by considering only the increase of the temperature as shown in JP2017-178055A, it may lead to a problem that the motor system becomes unstable due to overvoltage or overcurrent caused by an oscillation of the output voltage.

The present invention has been invented to solve such a problem, and an object thereof is to suppress the oscillation of the terminal voltage of the converter at the side of the inverter in the motor system.

According to one of the embodiments of the present invention, a control method for a motor system, the motor system having: a battery; a boost converter configured to increase DC voltage supplied by the battery; an inverter connected to the boost converter and configured to execute a conversion between DC power and AC power; and a motor generator connected to the inverter. The control method comprising: a limiting power determination step of determining a limiting power in response to an operating point of the motor generator such that an oscillation of a terminal voltage of the boost converter at a side of the inverter is suppressed; and a controlling step of controlling the operating point of the motor generator such that a passing power of the boost converter does not exceed the limiting power.

DESCRIPTION OF EMBODIMENTS

A control method for a motor system and a controller for a motor system in one of the embodiments of the present invention are described as follows.

Figure 1:
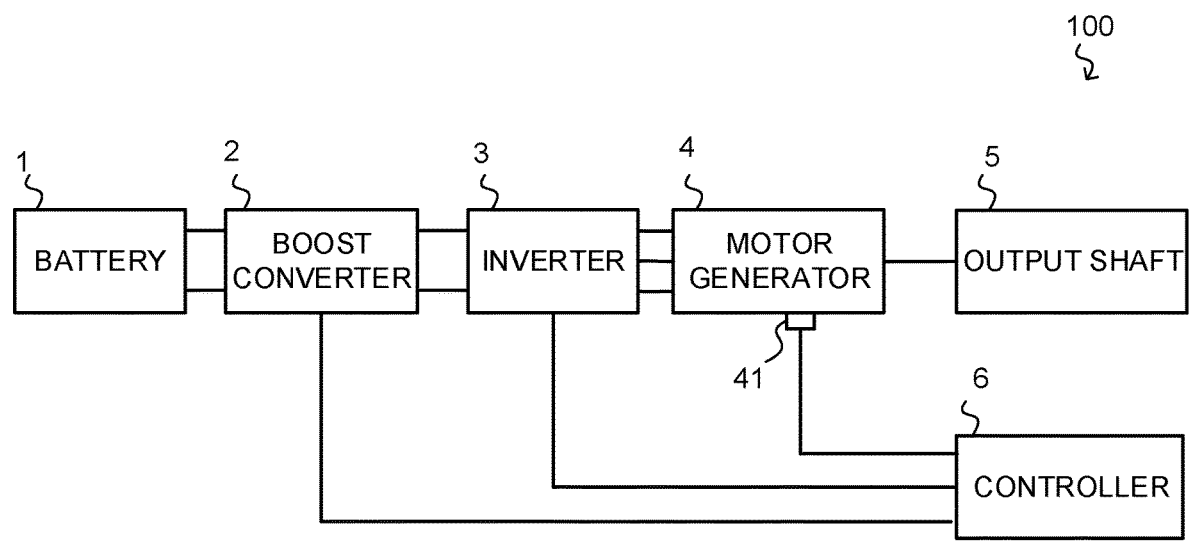
FIG. 1 is a schematic configuration diagram of a motor control system of the present embodiment.

FIG. 1 is a schematic configuration diagram of a motor system 100 of the present embodiment. When the motor system 100 is used in an electric vehicle, a motor generator 4 serves as a driving source of the vehicle.

The motor system 100 includes a battery 1, a converter 2, an inverter 3, and the motor generator 4 that are connected in series. The motor system 100 further includes an output shaft 5 connected to the motor generator 4 and a controller 6.

The battery 1 is a rechargeable battery that can be charged and discharged. The converter 2 is a boost converter and configured to boost DC power supplied from the battery 1, and supply the boosted power to the inverter 3. The inverter 3 configured to convert the DC power supplied from the converter 2 into AC power, and supplies the converted AC power to the motor generator 4.

The output shaft 5 is connected to the motor generator 4. The motor generator 4 works either as a motor or as a generator. When the motor generator 4 performs a power running operation, power is supplied from the converter 2 to the inverter 3 and the motor generator 4. When the motor generator 4 performs a regenerative operation, the regenerative power generated by the motor generator 4 is charged into the battery 1 through the inverter 3 and the converter 2.

The resolver 41 is provided in the vicinity of the motor generator 4 for detecting a rotation angle and a rotational speed of a rotor. When the motor system 100 is used for an electric vehicle, driving wheels (not shown in the figure) connected to the output shaft 5 are driven by the rotational output by the motor generator 4.

The controller 6 configured to control the converter 2 and the inverter 3, and receive such the rotation angle and the rotational speed of the motor generator 4 from the resolver 41. The controller 6 stores predetermined processes as a program and is configured to execute the processes corresponding to the program.

Figure 2:
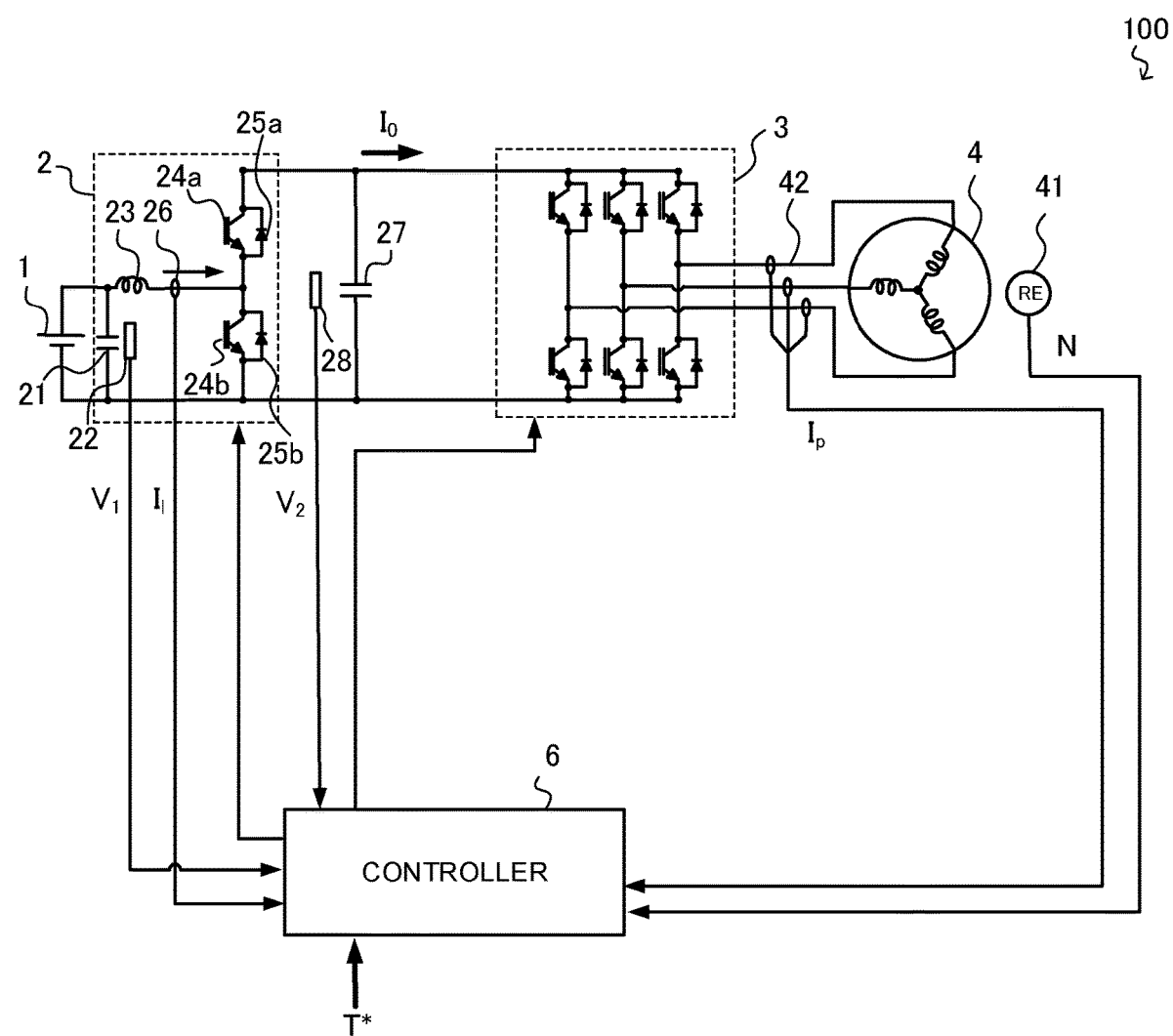
FIG. 2 is a circuit diagram of the motor control system.

FIG. 2 is a circuit diagram of the motor system 100.

The DC power supplied from the battery 1 is boosted by the converter 2 and supplied to the inverter 3. A battery side voltage $V_1$ which is a terminal voltage of the converter 2 at the side of the battery 1, and a current $I_1$ which flows in the converter 2 are detected by a voltage sensor 22 and a current sensor 26 provided in the converter 2 respectively. An inverter side voltage $V_2$ which is a terminal voltage of the converter 2 at the side of the inverter 3 is detected by a voltage sensor 28 provided near the converter 2.

The electric power output from the converter 2 to the inverter 3 is referred to as an inverter current $I_0$. The inverter current $I_0$ is positive when the inverter current $I_0$ is output from the converter 2 to the inverter 3, and the inverter current $I_0$ negative when the inverter current $I_0$ is input from the inverter 3 to the converter 2. A detailed configuration of the converter 2 will be described later with reference to FIG. 3.

The inverter 3 is a three-phase inverter and is constituted by a plurality of switching elements. The inverter 3 converts the DC power input from the converter 2 into the three-phase AC power, and supplies the three-phase AC power to the motor generator 4. Further, the inverter 3 converts the regenerative AC power generated by the motor generator 4 to the DC power that can be charged by the battery 1.

The resolver 41 detects the rotational speed N of the motor generator 4, and transmits the detected rotational speed N to the controller 6. A current sensor 42 is provided between the inverter 3 and the motor generator 4. The current sensor 42 detects a current of UVW-phases between the inverter 3 and the motor generator 4, and transmits a driving current $I_p$ to the controller 6. The drive current $I_p$ shows the detected currents of UVW-phases. In this figure, the output shaft 5 connected to the motor generator 4 is omitted.

The controller 6 generates a switching pattern in accordance with a torque command value T* for the motor generator 4 calculated by a host device, the rotational speed N detected by the resolver 41, the driving current $I_p$ detected by the current sensor 42, and the inverter side voltage $V_2$ detected by the voltage sensor 28. The controller 6 generates the switching pattern as a gate signal, and outputs the gate signal to the inverter 3. By driving the inverter 3 in response to the gate signal, the motor generator 4 rotates with a required torque.

The controller 6 determines a target inverter side voltage $V_2$* for the converter 2, which is a voltage input to the inverter 3, in accordance with the torque command value T* and the rotational speed N of the motor generator 4. The controller 6 generates a duty ratio D corresponding to the target inverter side voltage $V_2$*, and outputs the generated duty ratio D as a gate signal to the converter 2. By controlling switching elements 24a, 24b in accordance with the duty ratio D, a desired inverter side voltage $V_2$ can be obtained.

Figure 3:
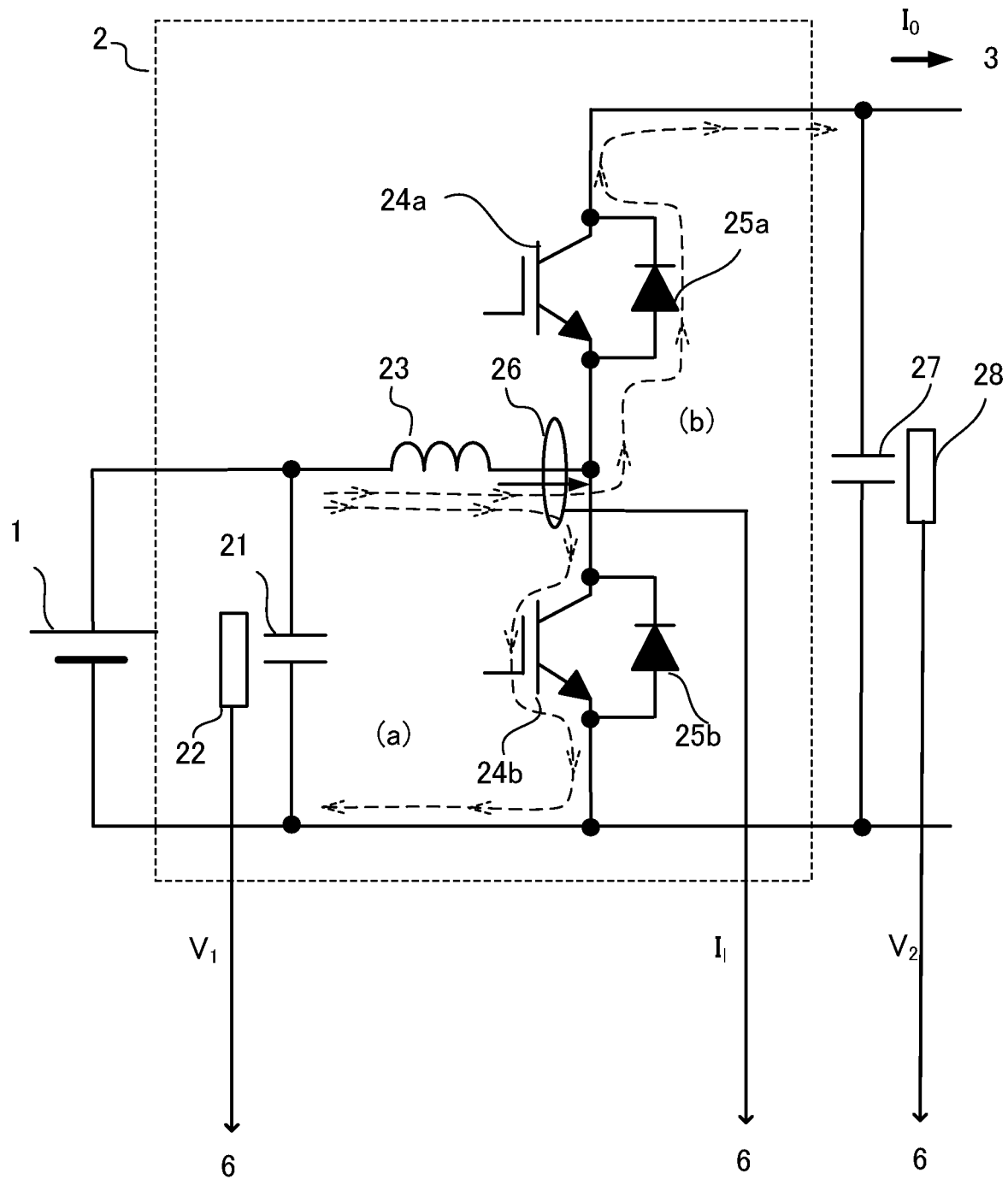
FIG. 3 is a detailed circuit diagram in the vicinity of a boost converter.

FIG. 3 is a detailed circuit diagram in the vicinity of the converter 2 in FIG. 2.

As shown in FIG. 3, a capacitor 21 is provided between the positive and negative electrodes of the power supply line from the battery 1. A noise included in the power supplied from the battery 1 to the converter 2 is suppressed by the capacitor 21. In the vicinity of the capacitor 21, the voltage sensor 22 is provided. The voltage sensor 22 detects the battery side voltage $V_1$ by measuring the voltage of the capacitor 21, and transmits the detected battery side voltage $V_1$ to the controller 6.

As for a reactor 23 (inductance), one end is connected to the positive electrode of the battery 1, and the other end is connected to one end of the switching element 24a and one end of the switching element 24b. The other end of the switching element 24a serves as a positive electrode at the output side of the inverter 3, and the other end of the switching element 24b serves as the negative electrode at the output side of the inverter 3. The switching elements 24a and 24b are composed of, for example, IGBT (Insulated Gate Bipolar Transistor).

Diodes 25a, 25b are connected in parallel to the switching elements 24a, 24b respectively. The diode 25a is provided so that the flow direction thereof is the direction from one end to the other end of the switching element 24a. The diode 25b is provided so that the flow direction is the direction from one end to the other end of the switching element 24b.

In the converter 2, wherein the switching elements 24a, 24b are controlled so that a state referred to as a turn-on state and the one as a turn-off state are mutually switched, the voltage is boosted up. Details of this mechanism are described as follows.

First, below is an explanation for the turn-on state in which the switching element 24a is off and the switching element 24b is on. In the turn-on state, the current output from the positive electrode of the battery 1 passes through the reactor 23 and the switching element 24b, and then flows to the negative electrode of the battery 1 (route (a)). Therefore, the reactor 23 stores electrical power from the battery 1.

Later, the state changes to the turn-off state in which the switching element 24a is turned on and the switching element 24b is turned off. In the turn-off state, the electric power stored in the reactor 23 is discharged, and the inverter current $I_0$ is supplied to the inverter 3 via the switching element 24a (route (b)). Due to this discharge, a voltage higher than the voltage supplied from the battery 1 is applied to the inverter 3.

In the converter 2, the inverter side voltage $V_2$ can be controlled by changing the duty ratio D, which is a ratio of the time for the turn-on state to a repetition time for the switching of the turn-on state and the turn-off state.

The current sensor 26 is provided between the reactor 23 and the switching elements 24a, 24b. The current sensor 26 detects the reactor current $I_1$ that flows through the reactor 23 and transmits the reactor current $I_1$ to the controller 6.

A capacitor 27 is provided between the terminals of the positive electrode and the negative electrode of the converter 2 at the side of the inverter 3. A voltage ripple caused by switching the switching elements 24a, 24b is suppressed by the capacitor 27. The voltage sensor 28 is provided in the vicinity of the capacitor 27. The voltage sensor 28 acquires the inverter side voltage $V_2$ by measuring the voltage of the capacitor 27, and transmits the inverter side voltage $V_2$ to the controller 6.

The performance of the converter 2 may be deteriorated due to an increase of a temperature caused by such an increase of the passing power, and/or be deteriorated due to an oscillation of the inverter side voltage $V_2$ described below. Therefore, the controller 6 controls an operating point of the motor generator 4 so that a passing power P of the converter 2 does not exceed a limiting power $P_{lim}$.

The controller 6 limits the power P imposed on the converter 2, hereinafter referred to as the passing power P of the converter 2, according to the limiting power $P_{lim}$. Methods for calculating the limiting power $P_{lim}$ for the passing power P of the converter 2 differ between when the motor generator 4 performs the power running operation and when the motor generator 4 performs the regenerative operation.

First, the case in which the motor generator 4 performs the power running operation, that is, the case in which the passing power P of the converter 2 is positive will be explained. In this case, the controller 6 calculates an output limiting power $P_{out}$ as the limiting power $P_{lim}$.

In the present embodiment, by supplying a constant power from the converter 2 to the inverter 3, the motor generator 4 performs the power running operation by the constant power. When the motor generator 4 is controlled with the constant power, a resistance component $R_0$ in an impedance of the motor generator 4 shows a negative resistance characteristic, and this negative resistance characteristic can cause an oscillation of the inverter side voltage $V_2$. Therefore, the following describes a suppressing condition for the oscillation caused by the negative resistance characteristic.

Figure 4:
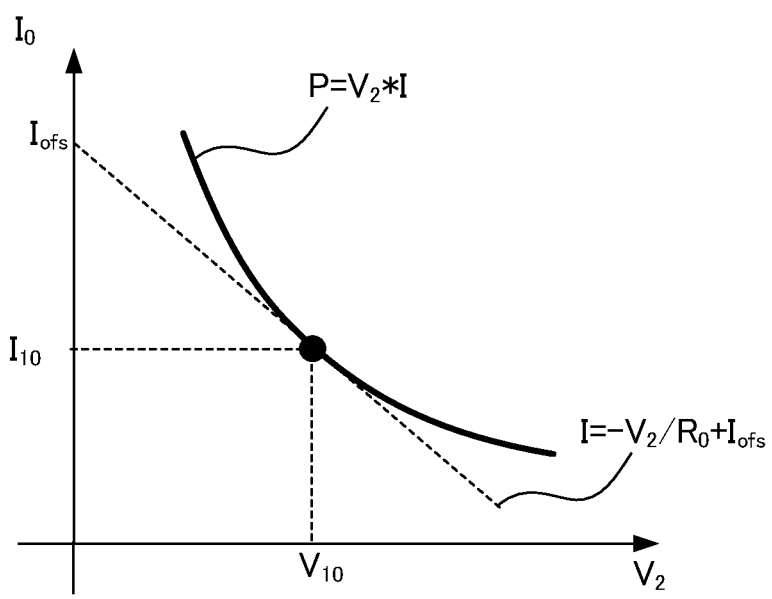
FIG. 4 is a graph showing a relation between an inverter side voltage $V_2$ and an inverter current $I_0$ in a motor generator.

FIG. 4 is a graph showing a relation between the inverter side voltage $V_2$ and the inverter current $I_0$.

Power supplied to the motor generator 4 is substantially equal to the passing power P of the converter 2. The passing power P is obtained by a multiplication between the inverter side voltage $V_2$ and the inverter current $I_0$. Since the motor generator 4 is controlled by the constant power and the passing power P is constant, the inverter side voltage $V_2$ is and the inverter current $I_0$ are inversely proportional to each other.

As shown in the graph, as the inverter side voltage $V_2$ increases, the inverter current $I_0$ decreases. This characteristic is called the negative resistance characteristic, and shows an opposite characteristic to the general characteristic that a current increases as an applied voltage increases.

The following equation is obtained by linearly approximating the relation between the inverter side voltage $V_2$ and the inverter current $I_0$ at a certain operating point. The resistance component $R_0$ in the impedance of the motor generator 4 is positive when the passing power P of the converter 2 is positive.

[Equation 1]

$$I_0 = -\frac{V_2}{R_0} + I_{ofs} \qquad (1)$$

The $I_0$ axis-intercept by the linearly approximated line is denoted as $I_{ofs}$. For example, when the inverter side voltage $V_2$ is $V_{10}$ and the inverter current $I_0$ is $I_{10}$ at a certain operating point of the motor generator 4, the resistance component $R_0$ of the motor generator 4 is shown as follows.

[Equation 2]

$$R_0 = \frac{V_{10}}{I_{10}} \qquad (2)$$

Using this resistance component $R_0$ and the like, a transfer characteristic from the battery side voltage $V_1$ to the inverter side voltage $V_2$ is expressed by the following equation.

[Equation 3]

$$V_2 = \frac{\frac{1}{LC}}{s^2 + \left(\frac{R}{L} - \frac{1}{R_0 C}\right)s + \frac{1}{LC}\left(D^2 - \frac{R}{R_0}\right)}\{DV_1 - (Ls + R)I_{ofs}\} \qquad (3)$$

Provided that L [H] is an inductance of the reactor 23, C [F] is a capacity of the capacitor 27, R [Ω] is a resistance component of the converter 2 in the turn-on state, and D is the duty ratio.

Here, in order to stabilize the inverter side voltage $V_2$ without divergence, "$R/L - 1/R_0 C$" of a coefficient of "s", which is a dominant parameter in a denominator of a first half of Equation (3), needs to be positive. Therefore, the resistance component $R_0$ is required to be set so as to satisfy the following condition.

[Equation 4]

$$R_0 > \frac{L}{RC} \qquad (4)$$

Further, in the motor generator 4, the relation of the following equation is known for the inverter side voltage $V_2$ to be applied, the inverter current $I_0$ to flow, the resistance component $R_0$, and the power P. The power P is equal to the passing power P of the converter 2.

[Equation 5]

$$R_0 = \frac{V_2}{I_0} = \frac{V_2^2}{P} \qquad (5)$$

From Equations (4) and (5), the following equation is obtained.

[Equation 6]

$$P < \frac{V_2^2 RC}{L} \qquad (6)$$

As a result, the output limiting power $P_{out}$ for stabilizing the inverter side voltage $V_2$ without diverging is expressed by the following equation.

[Equation 7]

$$P_{out} = \frac{V_2^2 RC}{L} \qquad (7)$$

The transfer characteristic from the battery side voltage $V_1$ to the inverter side voltage $V_2$ in the converter 2 can be represented by an equation other than Equation (3). The transfer characteristic may be obtained by taking into account a response characteristic G in which the inverter side voltage $V_2$ is an input and the inverter current $I_0$ flowing to the inverter 3 is an output. The response characteristic G can also be expressed as the response characteristic G of the inverter current $I_0$ flowing into the inverter 3 when the power P imposed on the converter 2 is applied to the inverter 3. By obtaining the transfer characteristic with considering the response characteristic G, the output limiting power $P_{out}$ for suppressing the oscillation of the inverter side voltage $V_2$ can be calculated more accurately.

In Equation (7), only the influence of the negative resistance characteristic of the motor generator 4 is considered, and the response characteristic G of the inverter 3 is not considered. The smaller the delay in the response characteristic G is, the stronger the influence of the negative resistance characteristic becomes. By considering the delay in the response characteristic G, the influence of the negative resistance characteristic becomes smaller, and the standard for suppressing the oscillation is loosen. Therefore, the output limiting power $P_{out}$ becomes larger than the one calculated using Equation (7). As described above, since Equation (7) calculated without considering the delay in the response characteristics G is a relatively strict criterion, setting the output limiting power $P_{out}$ by using Equation (7) results in the oscillation of the inverter side voltage $V_2$ being suppressed.

Next, the case in which the motor generator 4 performs the regenerative operation, that is, the case in which the passing power P of the converter 2 is negative, will be explained. In this case, the controller 6 calculates an input limiting power $P_{in}$ as the limiting power $P_{lim}$.

The inverter current $I_0$ flowing from the inverter 3 toward the converter 2 is represented as negative. Therefore, the resistance component $R_0$ of the motor generator 4 is negative. This is because the resistance component $R_0$ is calculated by the inverter side voltage $V_2$ and the inverter current $I_0$. Similarly, the passing power P of the converter 2 is negative because it is calculated by the inverter side voltage $V_2$ and the inverter current $I_0$.

The controller 6 controls the operating point of the motor generator 4 so that the passing power P of the converter 2 does not fall below the input limiting power $P_{in}$.

The response characteristic G of the inverter current $I_0$ in the inverter 3 includes the delay, and the inverter side voltage $V_2$ may oscillate due to the delay in the response characteristic G. This response characteristic G can be expressed by a secondary delay system in the following equation.

[Equation 8]

$$G = \frac{(2\pi f_2)^2}{s^2 + (2 \times \zeta_2 \times 2\pi f_2)s + (2\pi f_2)^2} \tag{8}$$

In this equation, $\zeta_2$ is a damping factor of the secondary delay system, $f_2$ is a natural resonant frequency in the secondary delay system. $\zeta_2$ and $f_2$ are both determined by the operating point of the motor generator 4. The delay in the response characteristic G is smaller, as the natural resonant frequency $f_2$ is smaller (the resonant frequency $\omega_2$ corresponding to the natural resonant frequency $f_2$ is higher). The delay in the response characteristic G is larger, as the natural resonant frequency $f_2$ is higher (the resonant frequency $\omega_2$ is higher).

Considering the response characteristic G in Equation (8), the transfer characteristic from the battery side voltage $V_1$ to the inverter side voltage $V_2$ of the converter 2 is expressed by the following equation.

[Equation 9]

$$V_2 = \frac{R_0(s^2 + 2\zeta_2\omega_2 s + \omega_2^2)DV_1 - R_0(Ls + R)\omega_2^2 I_{ofs}}{R_0 LCs^4 + R_0 C(2\zeta_2\omega_2 L + R)s^3 + R_0(LC\omega_2^2 + 2\zeta_2\omega_2 RC + D^2)s^2 + \omega_2\{R_0(CR\omega_2 + 2\zeta_2 D^2) - L\omega_2\}s + \omega_2^2(D^2 R_0 - R)} \tag{9}$$

In order to suppress the oscillation of the transfer characteristic from the battery side voltage $V_1$ to the inverter side voltage $V_2$, the real part in the solution to a polynomial of the denominator of Equation (9) needs to be negative while the polynomial equals to zero, and the polynomial is a characteristic equation. Thus, the condition as shown in the following equation is obtained.

[Equation 10]

$$R_0 < R_{0\,max} < 0 \tag{10}$$

Since the resistance component $R_0$ is negative, the resistance component $R_{0\,max}$ is a negative maximum value obtained from Equation (9).

The following condition is obtained by rearranging Equation (10) with Equation (5).

[Equation 11]

$$\frac{V_2^2}{R_{0max}} < P \tag{11}$$

Therefore, the input limiting power $P_{in}$ for stabilizing the inverter side voltage $V_2$ without divergence is obtained by the following equation.

[Equation 12]

$$P_{in} = \frac{V_2^2}{R_{0max}} \tag{12}$$

The controller 6 controls the operating point of the motor generator 4 so that the passing power P of the converter 2 does not fall below the input limiting power $P_{in}$.

Next, a limiting control performed by the controller 6 will be described.

Figure 5:
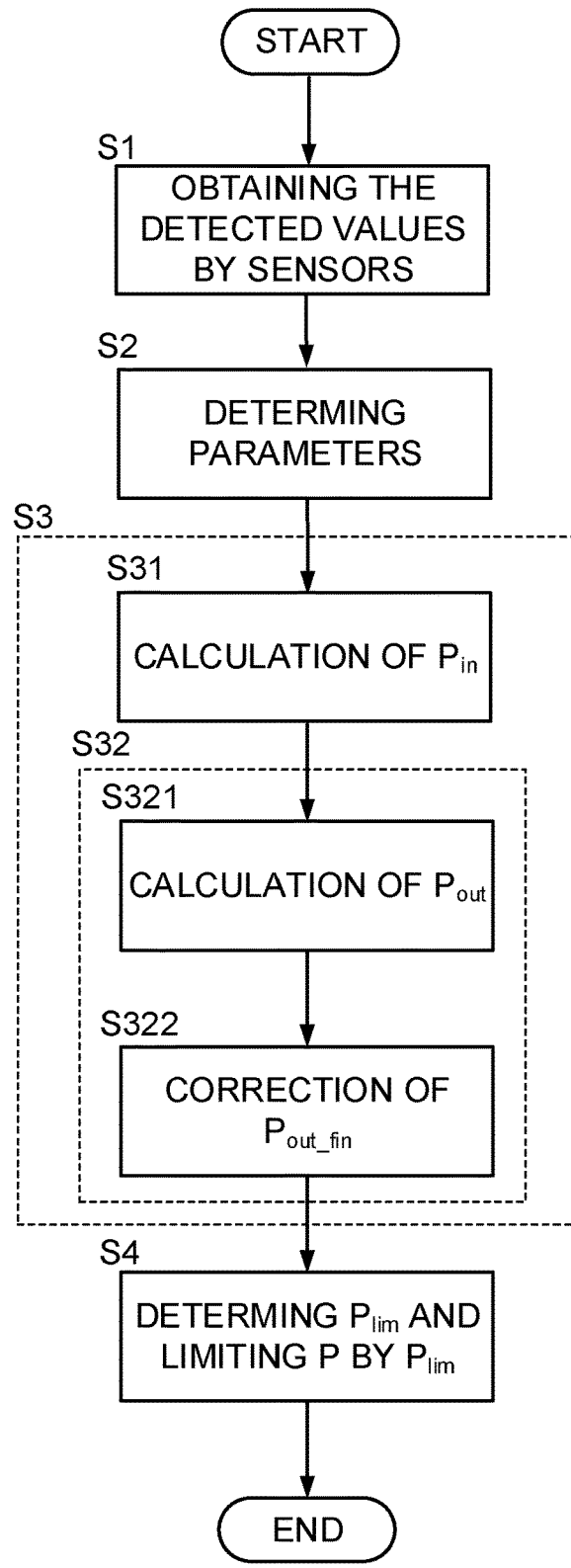
FIG. 5 is a flowchart showing a limiting control.

FIG. 5 is a flowchart showing the limiting control.

In step S1, the controller 6 reads parameters detected in the motor system 100, such as the battery side voltage $V_1$ obtained by the voltage sensor 22, the inverter side voltage $V_2$ obtained by the voltage sensor 28, the rotational speed N of the motor generator 4 obtained by the resolver 41.

Figure 6:
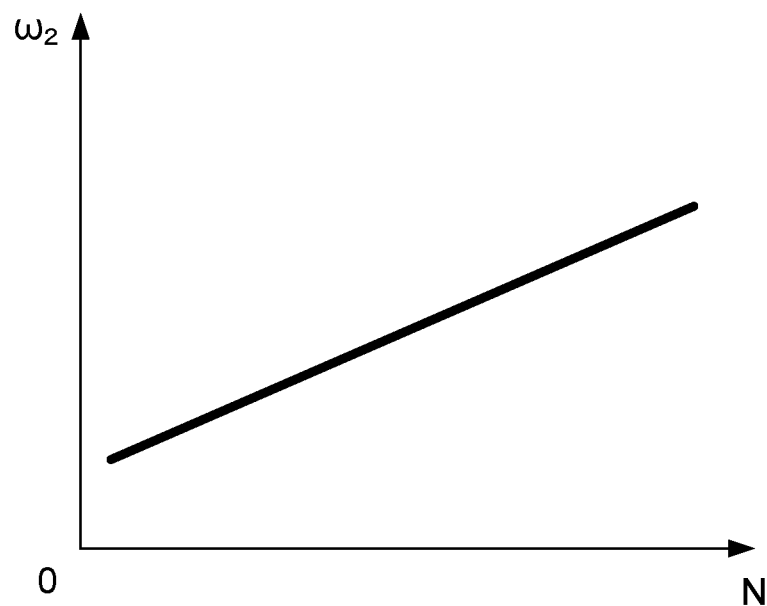
FIG. 6 is a graph showing a relation between a rotational speed N and a resonant frequency $\omega_2$.

In step S2, the controller 6 determines parameters necessary for calculation of the response characteristic G shown in Equation (8) and the like. More specifically, the controller 6 determines the damping factor $\zeta_2$ in accordance with the operating point of the motor generator 4. The controller 6 obtains the resonant frequency $\omega_2$ corresponding to the rotation speed N of the motor generator 4. The rotational speed N and the resonant frequency $\omega_2$ are correlated each other as shown in FIG. 6. Therefore, the controller 6 may calculate the resonant frequency $\omega_2$ based on the rotation speed N with the correlation. The controller 6 obtains the natural resonant frequency $f_2$ in accordance with the resonant frequency $\omega_2$.

In step S3, the controller 6 determines the limiting power $P_{lim}$. Step S3 includes processes of steps S31 and S32.

First, in step S31, the controller 6 obtains the input limiting power $P_{in}$ when the passing power P is negative, using Equation (12) based on $R_{0\,max}$ calculated by Equation (9).

More specifically, the controller 6 calculates $R_{0\,max}$ by using Equation (9) based on such the battery side voltage $V_1$ and the inverter side voltage $V_2$ acquired in step S1, and such the damping factor $\zeta_2$ and the natural resonant frequency $f_2$ calculated in step S2. Then, the controller 6 obtains the input limiting power $P_{in}$ from the calculated $R_{0\,max}$ and the inverter side voltage $V_2$ based on Equation (12). The controller 6 may store a map indicating a relation among the damping factor $\zeta_2$, the natural resonant frequency $f_2$, the battery side voltage $V_1$ and the inverter side voltage $V_2$, and the input limiting power $P_{in}$. The controller 6 determines the input limiting power $P_{in}$ using the respective parameters and the map.

Next, in step S32, the controller 6 obtains the output limiting power $P_{out}$ when the passing power P is positive. Step S32 includes processes of steps S321 and S322.

In step S321, the controller 6 calculates the output limiting power $P_{out}$ from Equation (7) using the predetermined values of R, L and C and the inverter side voltage $V_2$ acquired in step S1.

Figure 7:
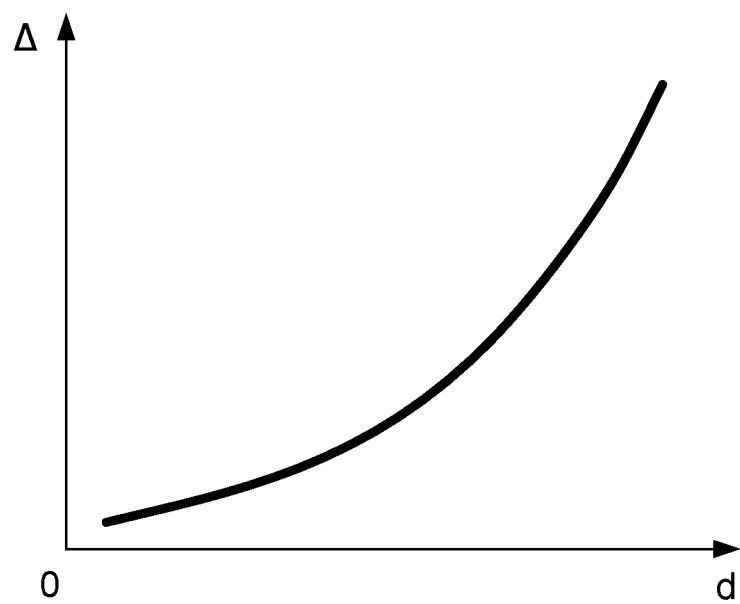
FIG. 7 is a graph showing a relation between a delay d of a response characteristic and a correction amount $\Delta$.

In step S322, the controller 6 calculates the output limiting power $P_{out\_fin}$ by correcting the output limiting power $P_{out}$ so as to take into account the delay in the response characteristic G. As shown in FIG. 7, a correction amount $\Delta$ becomes larger in the positive direction, as the delay d of the response characteristic G is larger. The controller 6 obtains the correction amount $\Delta$ corresponding to the delay d using FIG. 6, and calculates the output limiting power $P_{out\_fin}$ by adding the correction amount $\Delta$ to the output limiting power $P_{out\_fin}$. It should be noted that "$_{fin}$" is added as a suffix to the output limiting power $P_{out}$ in order to show that the delay in the response characteristic G is considered.

In the above explanation, the output limiting power $P_{out}$ is obtained by using Equation (7) in step S321, including but not limited to. Similar to the input limiting power $P_{in}$, based on the response characteristic G shown in Equation (8), the output limiting power $P_{out}$ may be obtained as shown in Equation (11) by using $R_{0\ max}$ obtained from Equation (9).

In step S4, the controller 6 determines the operating point of the motor generator 4 so that the passing power P of the converter 2 does not exceed the limiting power $P_{lim}$. Specifically, when the passing power P of the converter 2 is positive, the controller 6 determines the operating point of the motor generator 4 so that the passing power P does not exceed the output limiting power $P_{out}$ in the positive direction. When the passing power P is negative, the controller 6 determines the operating point of the motor generator 4 so that the passing power P does not exceed the input limiting power $P_{in}$ in the negative direction. In this manner, the operating point of the motor generator 4 is controlled such that the passing power P satisfies the suppressing oscillation condition determined by the limiting power $P_{lim}$.

Figure 8:
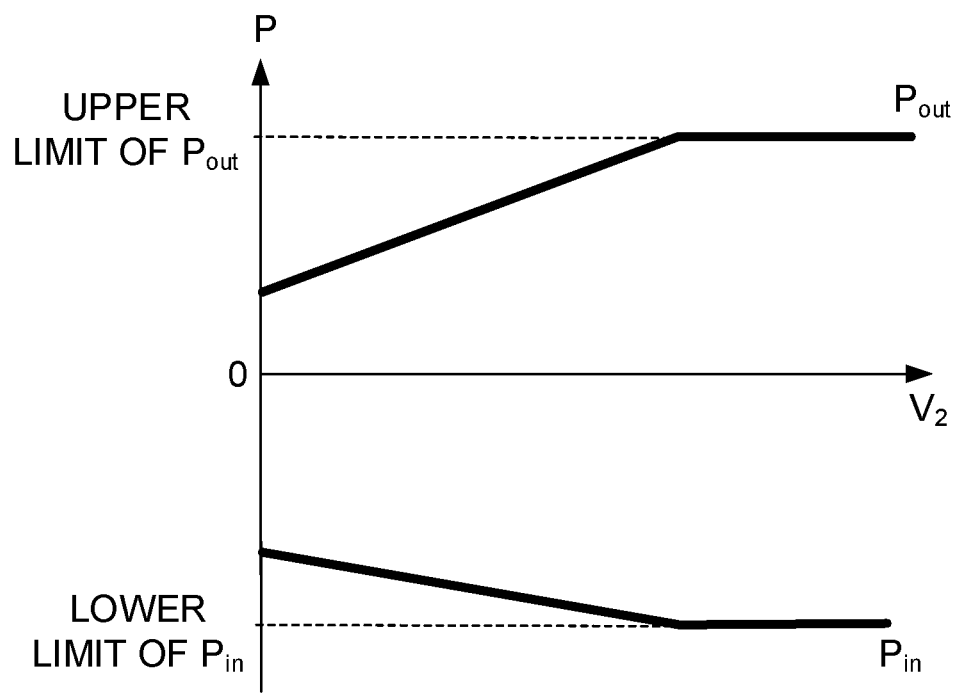
FIG. 8 is a graph showing a relation between the inverter side voltage $V_2$, an output limiting power $P_{out}$, and an input limiting power $P_{in}$.

FIG. 8 is a graph showing a characteristic relation between the inverter side voltage $V_2$, and the output limiting power $P_{out}$ and the input limiting power $P_{in}$. According to this graph, the absolute values of both the output limiting power $P_{out}$ and the input limiting power $P_{in}$ increase as the inverter side voltage $V_2$ becomes higher. This is shown in Equations (7) and (12).

Also, the output limiting power $P_{out}$ and the input limiting power $P_{in}$ may be changed according to the delay in the response characteristic G.

When the passing power P is positive, the influence of the negative resistance characteristic becomes larger, as the delay in the response characteristic G is smaller, so that the suppressing oscillation condition becomes stricter, and the output limiting power $P_{out}$ becomes smaller in the positive direction.

On the other hand, when the passing power P is negative, the system becomes more unstable, as the delay in the response characteristic G is larger. Therefore, the input limiting power $P_{in}$ is reduced.

When the response characteristic G is known, the output limiting power $P_{out}$ and the input limiting power $P_{in}$ are calculated based on the passing power P and the response characteristic G. Note that the output limiting power $P_{out}$ and the input limiting power $P_{in}$ may be set strictly so as to have a margin of in view of variations, and the margin is about 10%, for example.

Next, FIGS. 9A, 9B, 10A and 10B shows time charts indicating decreases of the inverter side voltage $V_2$ in accordance with the target inverter side voltage $V_2^*$ when the passing power P of the converter 2 is positive.

Figure 9A:
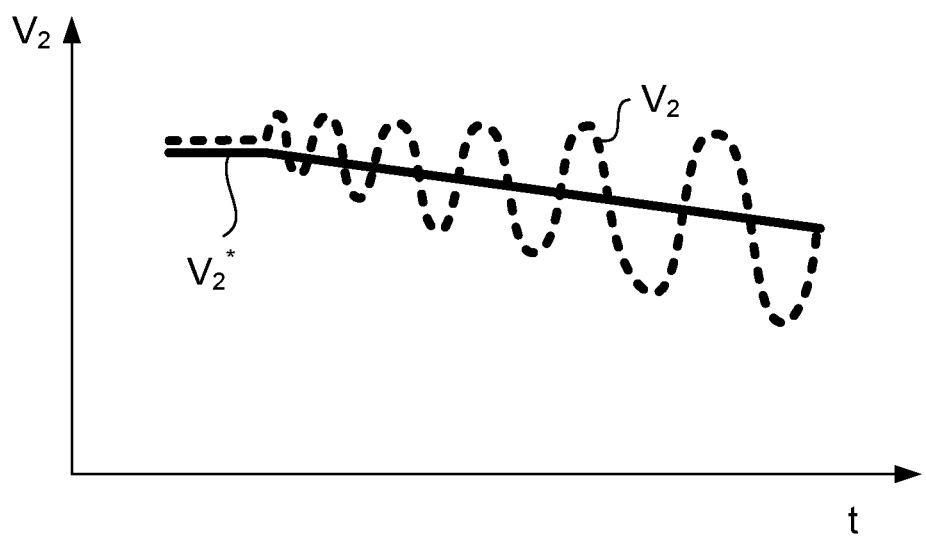
FIG. 9A is a graph showing changes over time in the inverter side voltage $V_2$ in a comparative example.
Figure 9B:
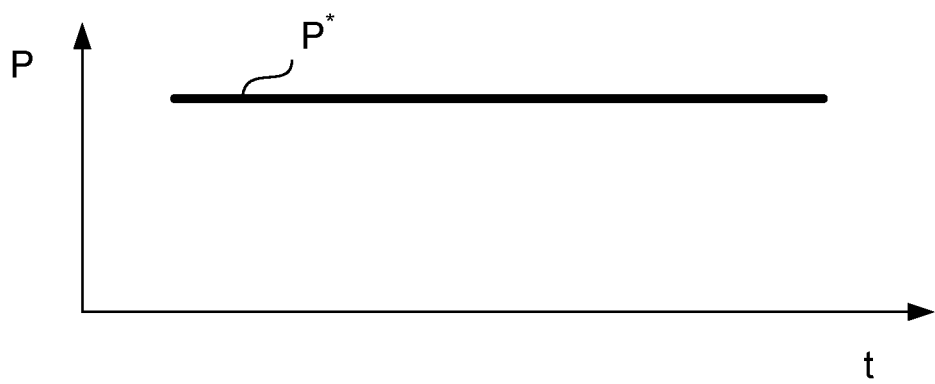
FIG. 9B is a graph showing changes over time in the passing power P of the converter.

FIGS. 9A and 9B are time charts in a comparative example. The vertical axis represents the inverter side voltage $V_2$ in FIG. 9A, and the vertical axis represents the passing power P in FIG. 9B.

Figure 10A:
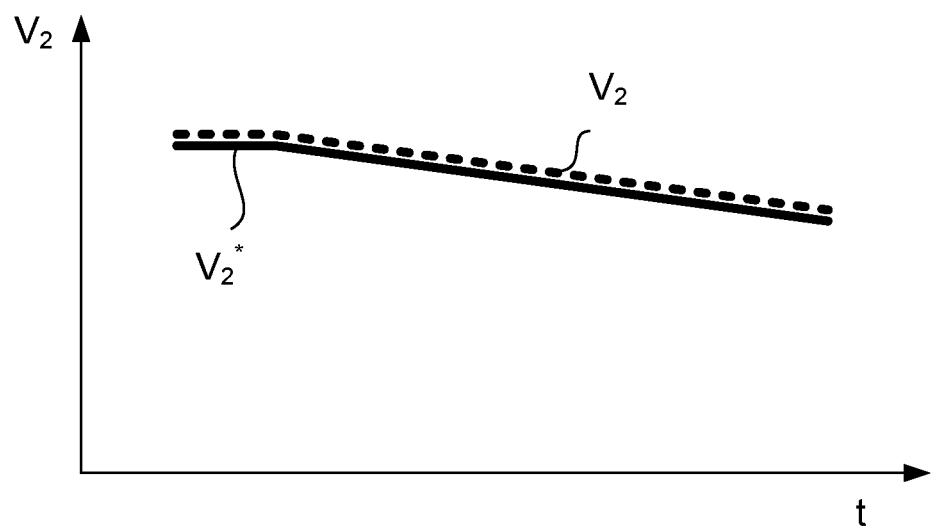
FIG. 10A is a graph showing changes over time of the inverter side voltage $V_2$ in the present embodiment.
Figure 10B:
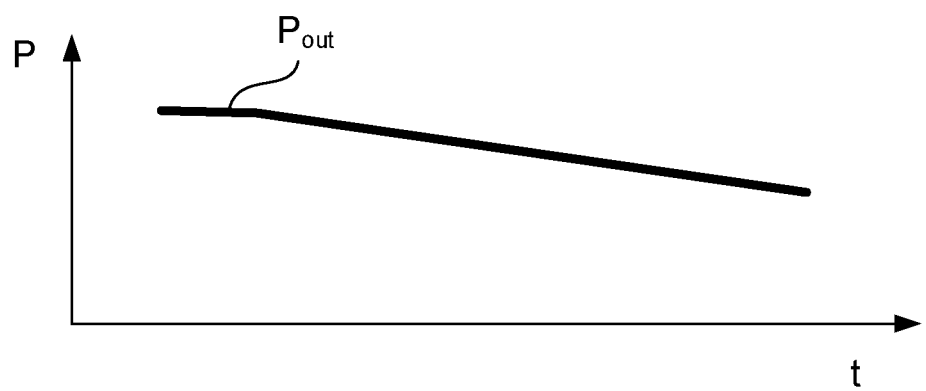
FIG. 10B is a graph showing changes over time in a passing power P.

FIGS. 10A, 10B are time charts in the present embodiment. The vertical axis represents the inverter side voltage $V_2$ in FIG. 10A, and the vertical axis represents the passing power P in FIG. 10B.

As shown in FIG. 9B, in the comparative example, the passing power P of the converter 2 is not limited and is constant. Since the passing power P of the converter 2 is positive as shown in FIG. 9A, even if the target inverter side voltage $V_2^*$ is controlled to be smaller as shown by the solid line, the inverter side voltage $V_2$ oscillates as shown by the dotted line due to the negative resistance characteristic of the motor generator 4.

As shown in FIG. 10B, in the present embodiment, since the passing power P of the converter 2 is positive, the passing power P of the converter 2 is limited by the output limiting power $P_{out}$. Therefore, as shown in FIG. 10A, the target inverter side voltage $V_2^*$ is limited and becomes smaller, thereby suppressing the oscillation of the inverter side voltage $V_2$ caused by the negative resistance characteristic. By limiting the passing power P in this manner, the oscillation of the inverter side voltage $V_2$ can be suppressed.

According to the first embodiment, the following effects can be obtained.

The control method for the motor system 100 according to the first embodiment includes the limiting power calculation step (S3) of calculating the limiting power $P_{lim}$ (the input limiting power $P_{in}$ and the output limiting power $P_{out}$) according to the operating point of the motor generator 4, and the controlling step (S4) of controlling the operating point of the motor generator 4 to limit the passing power P of the converter 2 so as not to exceed the limiting power $P_{lim}$. In other words, in step S4, the controller 6 controls the operating point of the motor generator 4 so that the passing power P satisfies the power condition for suppressing the oscillation as indicated by the limiting power $P_{lim}$.

Depending on the operating point of the motor generator 4, the inverter side voltage $V_2$ may oscillate. By controlling the operating point of the motor generator 4 so that the passing power P of the converter 2 does not exceed the limiting power $P_{lim}$ so as to avoid such operating point, it is possible to suppress the oscillation of the inverter side voltage $V_2$. In this manner, in the motor system 100, it is possible to prevent the overvoltage of the inverter side voltage $V_2$, the overcurrent of the inverter current $I_0$, and the torque oscillation of the motor generator 4.

According to the control method for the motor system 100 of the first embodiment, in the limiting power calculation step (S3), the limiting power $P_{lim}$ of the converter 2 is set such that the higher the inverter side voltage $V_2$ of the converter 2 is, the larger the absolute value thereof is.

According to Equation (12), the absolute value of the input limiting power $P_{in}$ becomes larger, as the inverter side voltage $V_2$ is larger. According to Equation (7), the absolute value of the output limiting power $P_{out}$ becomes larger, as the inverter side voltage $V_2$ is larger.

As described above, the higher the inverter side voltage $V_2$ is, the higher the stability of the motor system 100 becomes, and the inverter side voltage $V_2$ becomes more stable. Therefore, even if the absolute value of the limiting power $P_{lim}$ (the input limiting power $P_{in}$ or the output limiting power $P_{out}$) is set to be larger, the oscillation of the inverter side voltage $V_2$ can be suppressed.

According to the control method for the motor system 100 of the first embodiment, in the limiting power calculating step (S3), the limiting power $P_{lim}$ is changed in accordance with the response characteristic G in which the inverter side voltage $V_2$ is the input and the inverter current $I_0$ flowing to the inverter 3 is the output.

In the calculation of the input limiting power $P_{in}$ when the passing power P is negative, in step S31, Equation (12) based on the response characteristic G is used. In the calculation of the output limiting power $P_{out}$ when the passing power P is positive, the correction by the correction amount Δ corresponding to the delay d of the response characteristic G is performed in step S322.

The delay in the response characteristic G affects the stability of the motor system 100. Therefore, by calculating and correcting the limiting power $P_{lim}$ of the converter 2 in accordance with the delay in the response characteristic, the oscillation of the inverter side voltage $V_2$ can be suppressed.

In the control method for the motor system 100 of the first embodiment, when the passing power P of the converter 2 is positive, in step S322, the correction is performed by adding the correction amount Δ that increases in accordance with the delay d of the response characteristic.

When the passing power P of the converter 2 is positive, the stability of the motor system 100 decreases due to the negative resistance characteristic of the resistance component $R_0$ caused by the constant power control of the motor generator 4. The influence of negative resistance characteristic becomes stronger, as the delay in the response characteristic is smaller. Therefore, the correction amount Δ in the positive direction becomes smaller, and the output limiting power $P_{out}$ becomes smaller. As described above, the inverter side voltage $V_2$ can be prevented from oscillation by the output limiting power $P_{out}$, and the output limiting power $P_{out}$ for preventing becomes smaller as the delay in the response characteristic is smaller.

In the control method for the motor system 100 of the first embodiment, when the passing power P of the converter 2 is negative, in step S31, the calculation is performed with considering the response characteristic G represented by Equation (8).

When the passing power P of the converter 2 is negative, the delay in the response characteristic G is the dominant cause of the oscillation of the inverter side voltage $V_2$. Therefore, the smaller the delay in the response characteristic G is, the more stable the system becomes, and therefore the absolute value of the input limiting power $P_{in}$, which is a negative value, can be set to be smaller. As described above, the inverter side voltage $V_2$ can be prevented from oscillation by the input limiting power $P_{in}$, and the input limiting power $P_{in}$ for preventing becomes larger as the delay in the response characteristic is smaller.

(Modification)

In the above embodiment, the motor system 100 has been described as the example in which one motor generator 4 is provided, but is not limited thereto. In this modification, an example in which two motor generators, a first motor generator 4A and a second motor generator 4B, are provided in the motor system 100 will be described.

Figure 11:
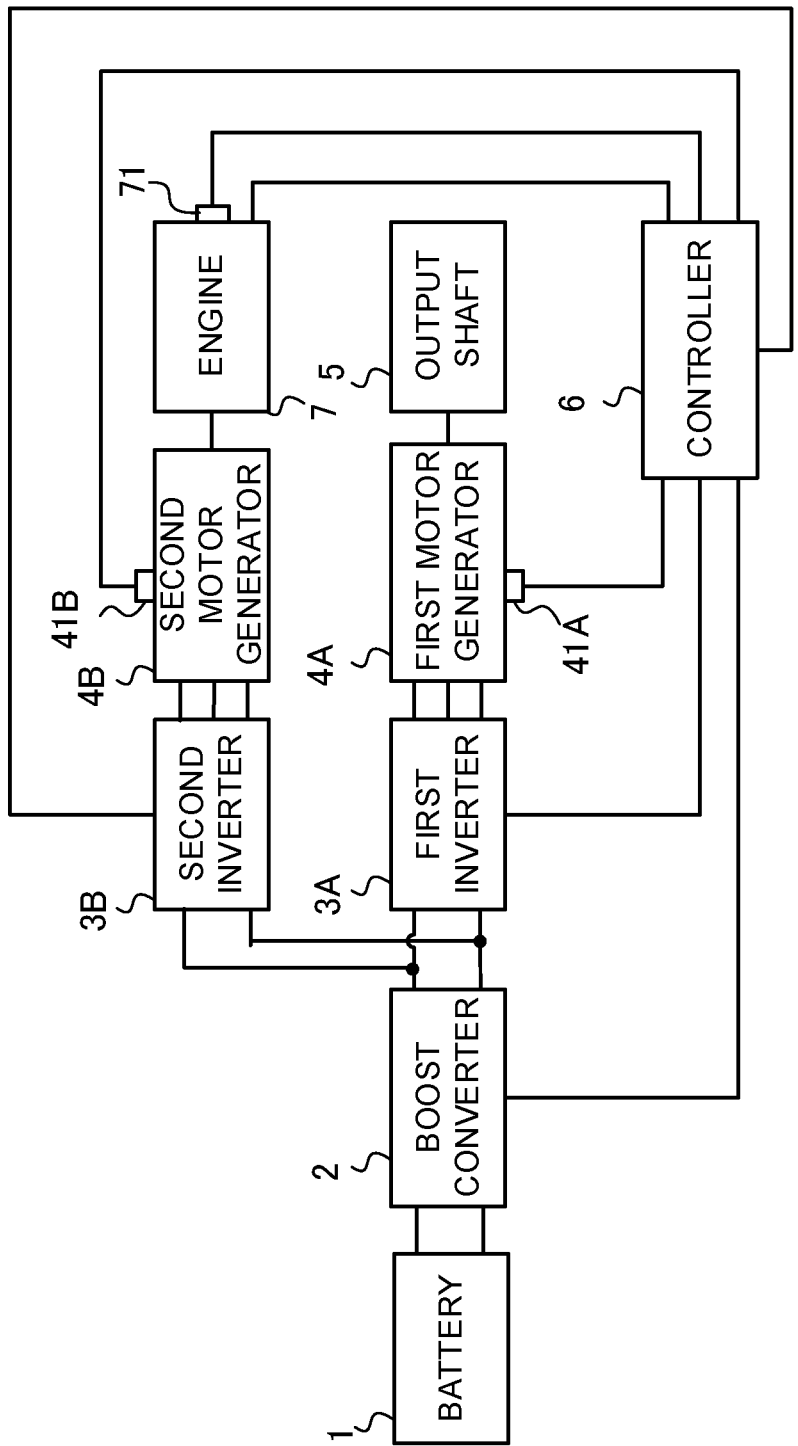
FIG. 11 is a schematic configuration diagram of one of variations of the motor control.

FIG. 11 is a diagram showing a configuration of a motor system 100 of the modification. For example, the motor system 100 may be used for a hybrid vehicle or the like. The motor system 100 of the present modification has a first inverter 3A and a first motor generator 4A, which are used for driving the output shaft 5, same as in the motor system 100 shown in FIG. 1.

The motor system 100 further includes a second inverter 3B and a second motor generator 4B. The second inverter 3B boosts the voltage supplied from the converter 2 and supplies the boosted voltage to the second motor generator 4B. The second motor generator 4B serves as a starter for an engine 7. Incidentally, a torque transmitting device may be provided between the engine 7 and the output shaft 5, and the output torque from the engine 7 may be transmitted to the output shaft 5. Also, a resolver 41B is provided in the second motor generator 4B. A resolver 71 is provided in the engine 7 for detecting a rotation angle or a rotation speed of a crankshaft of the engine 7.

The controller 6 is configured to control the converter 2, the first inverter 3A and the second inverter 3B, and accept the rotational speed of the first motor generator 4A from the resolver 41A, the rotational speed of the second motor generator 4B from the resolver 41B and the rotational speed of the engine 7 from the resolver 71.

Figure 12:
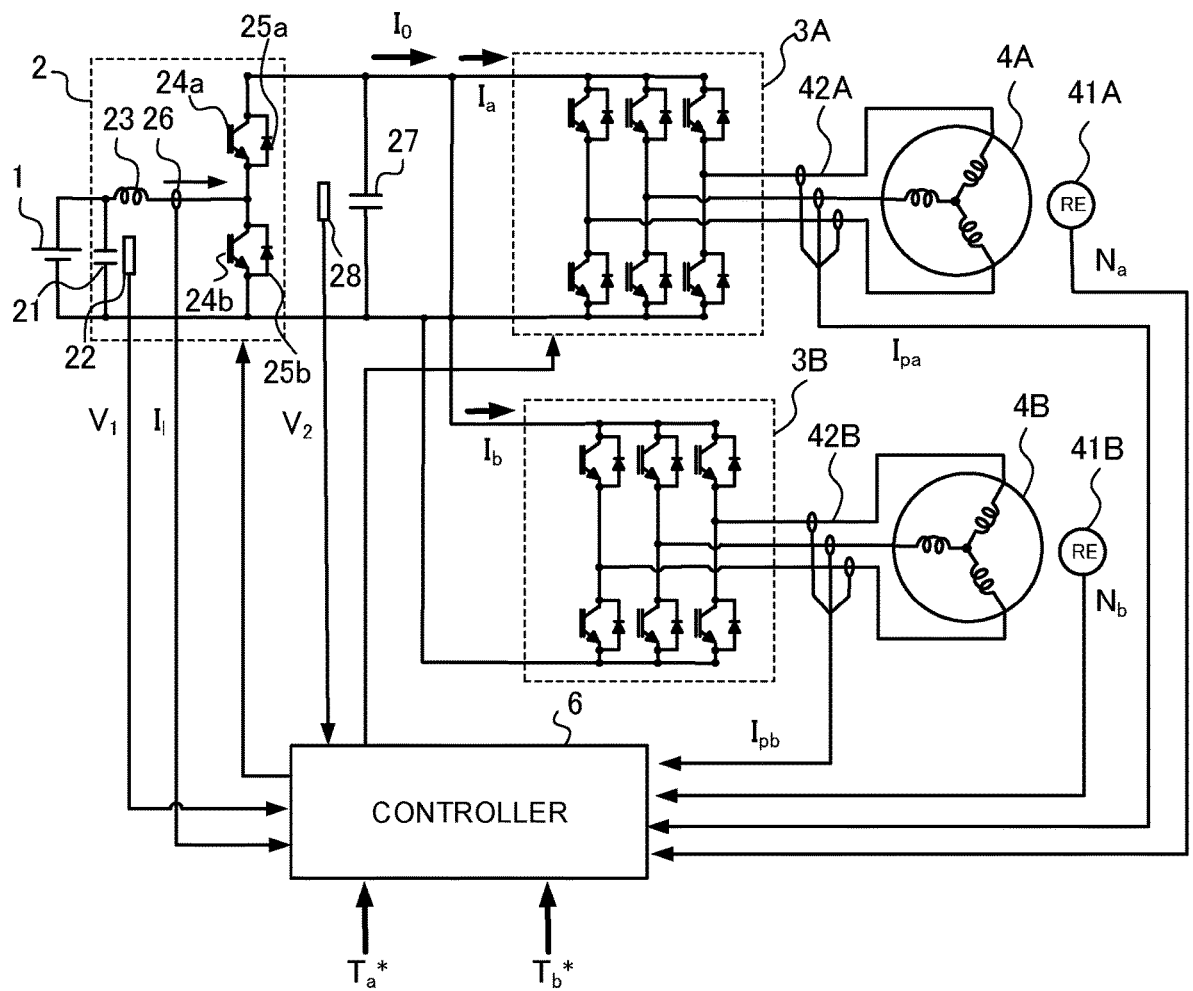
FIG. 12 is a circuit diagram of the motor control system.

FIG. 12 is a schematic diagram of the motor system 100. The controller 6 receives a torque command value $T_a^*$ for the first motor generator 4A and a torque command value $T_b^*$ for the second motor generator 4B, which are calculated by the host device, the rotational speeds $N_a$ and $N_b$ detected by the resolvers 41A and 41B respectively, the drive currents $I_{pa}$ and $I_{pb}$ detected by current sensors 42A and 42B respectively, the inverter side voltage $V_2$ detected by the voltage sensor 28, and the like. The controller 6 controls the converter 2, the first inverter 3A, the second inverter 3B, and the like, based on these inputs.

The passing power P of the converter 2 is indicated by the sum of $P_a$ and $P_b$, provided that $P_a$ is a required power for the first motor generator 4A and $P_b$ is a required power for the second motor generator 4B.

For example, when each of the first motor generator 4A and the second motor generator 4B performs the power running operation, both $P_a$ and $P_b$ are positive ($P_a>0$, $P_b>0$). When each of the first motor generator 4A and the second motor generator 4B performs the regenerative operation, $P_a$ and $P_b$ are both negative ($P_a<0$, $P_b<0$).

The controller 6 performs the limiting control for the passing power P of the converter 2 as shown in FIG. 5. In step S4, the controller 6 controls the first motor generator 4A and the second motor generator 4B so that the sum of $P_a$ and $P_b$ meets the condition shown as the limiting power $P_{lim}$.

For example, when the passing power P is negative, either the first motor generator 4A or the second motor generator 4B may perform the power running operation so that the passing power P, which is the sum of $P_a$ and $P_b$, does not fall below the input limiting power $P_{in}$.

While embodiments of the present invention have been described above, the above embodiment is only a part of the applicable example of the present invention, and the technical scope of the present invention is not intended to limit the technical scope of the present invention to the specific configuration of the above embodiment. The above embodiments can be combined as appropriate.

The invention claimed is:

1. A control method for a motor system, the motor system having
    a battery;
    a boost converter configured to increase DC voltage supplied by the battery;
    an inverter connected to the boost converter and configured to execute a conversion between DC power and AC power; and
    a motor generator connected to the inverter, wherein
    the control method comprising:
        a limiting power determination step of determining a limiting power in response to an operating point of the motor generator such that an oscillation of a terminal voltage of the boost converter at a side of the inverter is suppressed; and
        a controlling step of controlling the operating point of the motor generator such that a passing power of the boost converter does not exceed the limiting power.

2. The control method for the motor system according to claim 1, wherein
    in the limiting power determination step, an absolute value of the limiting power is set to be larger as the terminal voltage is higher.

3. The control method for the motor system according to claim 1, wherein
    in the limiting power determination step, the limiting power is changed in response to a delay in a response characteristic in which the terminal voltage is an input and a current flowing to the inverter is an output.

4. The control method for the motor system according to claim 3,
    in the limiting power determination step, when the boost converter outputs power to the inverter, the limiting power is set to be smaller as the delay is smaller.

5. The control method for the motor system according to claim 3,
    in the limiting power determination step, when power is input to the boost converter from the inverter, the limiting power is set to be larger as the delay is smaller.

6. A control device for a motor system, the motor system having
    a battery;
    a boost converter configured to increase DC voltage supplied by the battery;
    an inverter connected to the boost converter and configured to execute a conversion between DC power and AC power;
    a motor generator connected to the inverter, and
    a controller configured to control the motor generator, wherein
    the controller configured to:
    determine a limiting power in response to an operating point of the motor generator such that an oscillation of a terminal voltage of the boost converter at a side of the inverter is suppressed; and
    control the operating point of the motor generator such that a passing power of the boost converter does not exceed the limiting power.

* * * * *